July 31, 1923.
H. PETERSON
AGRICULTURAL IMPLEMENT
Filed Jan. 22, 1921
1,463,485
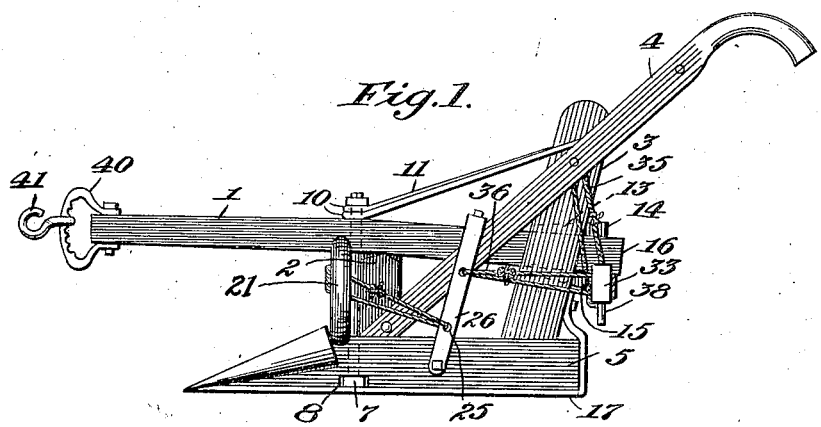
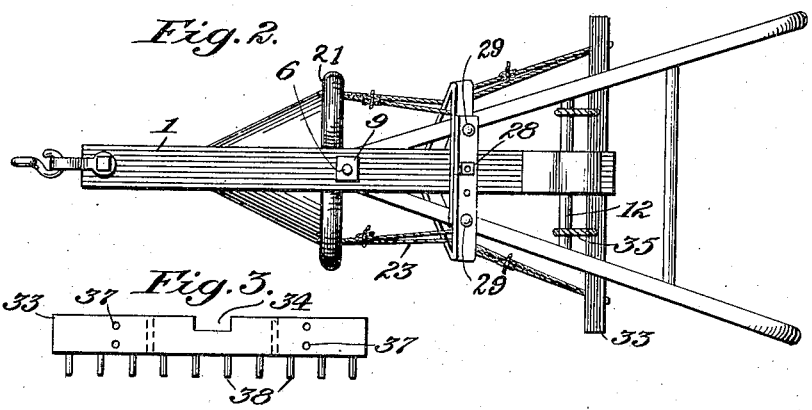
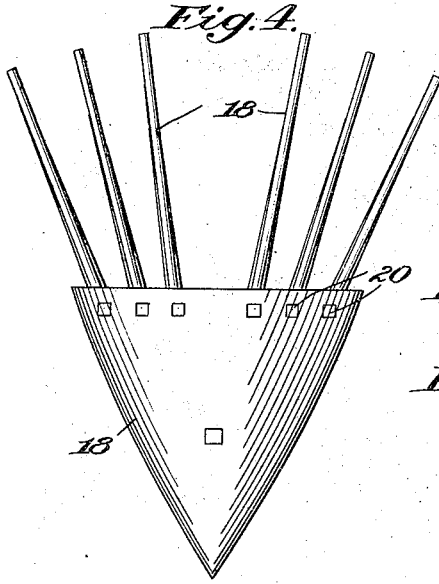
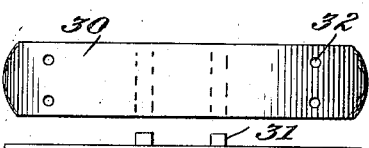
Inventor:
Henry Peterson,
by Wm H Babcock & Son
Att'ys.

Patented July 31, 1923.

1,463,485

UNITED STATES PATENT OFFICE.

HENRY PETERSON, OF HAMILTON, MONTANA.

AGRICULTURAL IMPLEMENT.

Application filed January 22, 1921. Serial No. 439,113.

*To all whom it may concern:*

Be it known that I, HENRY PETERSON, a citizen of the United States, residing at Hamilton, in the county of Ravalli and State of Montana, have invented certain new and useful Improvements in Agricultural Implements, of which the following is a specification.

The present invention relates to agricultural implements and more partciularly to a combination potato digger, hillers, ditch digger and seed coverer.

Heretofore it has been customary to have a separate implement for each of the above operations or, at best only several of the operations obtainable by one implement. Where more than one operation was contemplated by the same implement there was complexity in the construction, high cost to the farmer, an unnecessarily increased number of parts to get out of order, inefficient operation, and many other evident objections.

The main purposes of the present invention are to provide an inexpensive, simply constructed, efficient and durable combination implement of the type mentioned which will efficiently perform all of the operations stated while at the same time avoiding the various objections both as to prior separate implements and as to prior combination implements.

In order to more clearly disclose the construction, operation, and use of the invention, reference should be had to the accompanying drawings forming part of the present application.

In the drawings:

Fig. 1 is a side elevation of the invention, arranged as a ditcher and with rake applied;

Fig. 2 is a top plan view of Fig. 1, with brace rods omitted;

Fig. 3 is a front view of the rake;

Fig. 4 is a top plan view of the plow point with separator rods attached;

Fig. 5 is a front view of the ditcher plate;

Fig. 6 is a like view of the coverer plate; and,

Fig. 7 is a top or edge view of Fig. 6.

In general arrangement, the main framework of the combination implement follows that of an ordinary horse drawn plow and comprises beam 1, front and rear standards 2 and 3, handles 4, and runner or base 5. The under face of the beam is mortised to receive a tenon on the upper end of standard 2, the mortise and tenon being so formed that the beam may rock on standard 2. A bolt 6 having its head 7 seated in a recess 8 in runner 5 extends through beam 1 and, through nut 9 threaded thereon, serves to clamp beam 1 onto the upper end of standard 2, the lower end of the standard being made fast to the runner 5. Bolt 6 also serves, through the eyes or loops 10 to secure the forward ends of the brace rods 11, the opposite ends of which are secured either directly to handles 4 or to the cross rod or bar connecting them. Rod 12 passes directly through the upper end of the rear standard 3 the lower end of which is made fast in the rear of the runner 5. The standard 3, at a point in line with the rear end of beam 1 is provided with an opening 13 tapering from front to rear and adapted to adjustably receive the reduced end 16 of beam 1. By means of upper and lower wedges 14 and 15 which may be inserted between the beam end and adjacent walls of opening 13, the beam may be tipped or rocked on the upper end of the front standard 2 to regulate the draft or the depth to which the point will enter. A wear plate or shoe 17 extends beneath runner 5, for its entire length, up around its rear end and is made fast to the rear standard 3, serving to protect and cover runner 5, enclose and retain bolt head 7, and brace the runner, while at the same time providing an easy sliding surface for the runner.

Mounted on the forward part or end of the runner is a digging point or tip 18 substantially triangular in longitudinal cross section, and laterally convex, spreading or widening rearwardly toward either side, from the tip or point. It may be bolted, riveted or otherwise suitably secured to the runner end, in well known manner. For use as a potato digger a series of separating rods 19 are used with this point, slightly divergent, rearwardly. They are removably secured to the rear under face of the point by bolts 20 or other suitable means, in much the same manner as the blades of a mowing machine are secured to the cutter bar. Preferably, the heads of the rods, through which the securing bolts are passed are so proportioned and constructed as to act as spacing blocks, in usual and well known manner, though this is not in any way essential. When the implement is used as a potato digger, the several attachments may be omitted, and when not so used, the rods 19 may be removed and the particular attachment secured in operative position.

Should it be desired to use the implement for hilling vegetables of any kind, the attachment shown in Fig. 5 is used, being secured in the position and manner shown in Figs. 1 and 2. This comprises a plate 21 of the general outline of a heart, having the tip deeply and widely notched as at 22. When in position, as shown in Figs. 1 and 2, the plow beam 1 seats in the upper curved depression or notch of the plate, while the runner 5 seats in the lower. Consequently, the plate extends appreciably above the lower face of the beam at each side and considerably below the upper face of runner 5 at each side. As will be seen, the rear edge of tip 18, due to the inclination, relatively to the runner 5, extends somewhat above the top of runner 5. Consequently, the lower ends of plate 21 will also extend considerably below the rear edge of the tip 18. Therefore, the earth raised by the tip will be immediately engaged by plate 21 and forced to each side and against the vegetable rows—hilling them, as the implement advances. Of course, ditching may be effected in the same way, the depth or shallowness of the ditch being regulated by the adjustment of wedges 14 and 15, as will be obvious. It is essential, of course, to adequately secure plate 21 against the strains it will meet. For this purpose, it is designed to rest against the bolt 6 which bears against standard 2 and to prevent possible lateral slipping, ribs 22 are provided, arranged to parallel standard 2 on either side of the bolt 6. To prevent twisting of the plate about its vertical axis, strong wire ropes or the like 23 are used, being looped through holes 24 in plate 21 and similar holes 25 in the side members 26 of a metal frame which comprises two similar angle bars each bolted at the lower end to the runner 5 and each provided with a plurality of perforations in its upper end adapted to be aligned with similar perforations in the other member to receive a common securing bolt 28 which may be passed through these aligned openings, through the beam 1, and secured in place by a suitable nut. To avoid twisting of one angle iron, relatively to the other, pins 29 are passed through aligned openings at each side of the beam, making the frame practically a unitary, rigid structure, as will be clear. Obviously, rigid wire or iron rods or similar rods with turnbuckle adjustment for various lengths may be used in place of the ropes 23. Their construction, application and operation will be so readily understood that it is not thought necessary to illustrate them. By spreading frame members 26 more or less, the connecting devices 23 may be made to draw in a line more exactly parallel with beam 1, thereby giving a greater bracing effect.

When it is desired to use the implement as a coverer, as in planting potatoes, for instance, instead of plate 21, a coverer plate 30 is used, of a different construction, disposed differently, and operating in a different way. It has short ribs 31 and perforations 32 which operate in the same way as the corresponding elements of plate 21, and it is held in operative position in the same manner. It should be particularly noticed that there is no notch in its lower edge— that its lower edge, when in position, is coincident with the upper face of runner 5 on which it rests and that no part of it extends below this upper face of runner 5. Of course, also, when the implement is being used between two rows, after the seed has been placed, the beam will be adjusted for very shallow plowing. Consequently, the coverer plate will simply scrape the earth at the tops of the rows into the seed drills or furrows, just enough to adequately cover the seed, but will have no hilling effect, as in the case of the ditching or hilling plate 21.

In the case of small seed planted on ridges, and to be raked in or covered only very lightly, plate 30, of course, is not practicable—it would simply scrape all the seed from the ridges, loosely to the sides thereof, leaving the tops bare and the sides loosely scattered over with uncovered stray seeds. For such work, especially, the rake bar attachment 33 has been designed. This comprises a head or bar of sufficient length, to extend across the tops of two parallel seed rows or ridges, when in place on the implement, the implement being about midway between the rows. It is provided with a notch 34 about the centre of its upper edge and adapted to receive the lower face or edge of the reduced end 16 of beam 1, to prevent the rake head from sliding laterally, relatively to beam 1. In order to hold it up to a solid seat against the beam end, ropes 35 may be used, one at or near each end and connecting the rake with the corresponding end of cross bar 12. And to prevent any twisting movement, ropes 36 may be used, being looped through perforations 37 and through perforations in the frame members 26, in the same manner as with plates 21 and 30, as will be well understood. The head, of course, is provided with rake teeth 38 which rake in the seed as the implement is drawn forward. Clearly, rods with turnbuckles or other well known connecting means may be substituted for the ropes 35 and 36, as previously explained relatively to ropes 23.

The clevis 40 with a series of notches to adjustably receive the quick-turning clevis hook 41, for short turning at the end of a row, enables the use of the implement in very close quarters.

It is to be clearly understood, of course, that practically all of the parts of the implement, and especially the several attachments 21, 30, and 33 may be made of iron, wood, or any other suitable material.

Many changes may be made in the construction, arrangement, and disposition of the various parts of the invention, within the scope of the claims, without in any way departing from the field and scope of the invention, and it is meant to include all such within this application.

Having thus described my invention, what I claim and desire to protect by Letters Patent is:

1. An agricultural implement comprising a beam, a runner, standards connecting said runner and beam, a digging member carried by said runner, a plate mounted in front of one of said standards and carried by said runner, a frame connected to said runner and extending upwardly and outwardly therefrom to either side of the aforesaid beam, and connections between the opposite sides of said frame and the corresponding ends of the aforesaid plate.

2. An agricultural implement comprising a beam, a runner, standards connecting said runner and beam, a digging member carried by said runner, a plate mounted in front of one of said standards and carried by said runner, a frame connected to said runner and extending upwardly and outwardly therefrom to either side of the aforesaid beam, connections between the opposite sides of said frame and the corresponding ends of the aforesaid plate, and means for adjusting said frame.

3. An agricultural implement comprising a beam, a runner, standards connecting said runner and beam, a digging member carried by said runner, a plate mounted in front of one of said standards and carried by said runner, a frame connected to said runner and extending upwardly and outwardly therefrom to either side of the aforesaid beam, connections between the opposite sides of said frame and the corresponding ends of the aforesaid plate, and means for preventing twisting of said frame.

4. An agricultural implement comprising a beam, a runner, standards connecting said runner and beam, a digging member carried by said runner, a plate carried by said runner and rockably mounted on the front of one of said standards, an adjustable triangular frame connected to said runner in the rear of the forward standard and extending upwardly and outwardly considerably to each side of said beam, connections between the opposite side members of said frame and the corresponding end of said plate, and means for adjusting said frame.

5. An agricultural implement comprising a beam, a runner, standards connecting said runner and beam, a digging member carried by said runner, a plate carried by said runner and rockably mounted on the front of one of said standards, an adjustable triangular frame connected to said runner in the rear of the forward standard and extending upwardly and outwardly considerably to each side of said beam, connections between the opposite side members of said frame and the corresponding end of said plate, means for adjusting said frame, and means for preventing twisting of said frame.

6. An agricultural implement comprising a beam, a runner, standards connecting said runners and beam, a digging member carried by said runner, a plate carried by said runner and rockably mounted on the front of one of said standards, ribs carried by said plate and adapted to engage said standard to prevent said plate from slipping laterally about said standard, an adjustable triangular frame connected to said runner in the rear of the forward standard and extending upwardly and outwardly considerably to each side of said beam, connections between the opposite side members of said frame and the corresponding end of said plate, means for adjusting said frame, and means for preventing twisting of said frame.

7. An attachment for agricultural implements comprising, a plate adapted to be carried thereby and to extend from the digging point to the beam and having edges extending below the rear edge of the digging point and above the lower edge of the beam and provided with means adapted to engage a standard of said implement to prevent lateral movement of said plate relatively to the standard of said implement.

Signed at Hamilton, county of Ravalli, State of Montana, this 17th day of January, 1921.

HENRY PETERSON.